G. W. LALLY.
AUTO GARBAGE TRUCK.
APPLICATION FILED FEB. 28, 1911.

1,018,119.

Patented Feb. 20, 1912.
3 SHEETS—SHEET 1.

Witnesses:
C. L. Rogers
Edward Maxwell

Inventor:
George W. Lally,
by Geo. H. Maxwell
Atty.

G. W. LALLY.
AUTO GARBAGE TRUCK.
APPLICATION FILED FEB. 28, 1911.

1,018,119.

Patented Feb. 20, 1912.

3 SHEETS—SHEET 2.

Witnesses:
C. L. Rogers
Edward Maxwell

Inventor:
George W. Lally,
by Geo. W. Maxwell, atty.

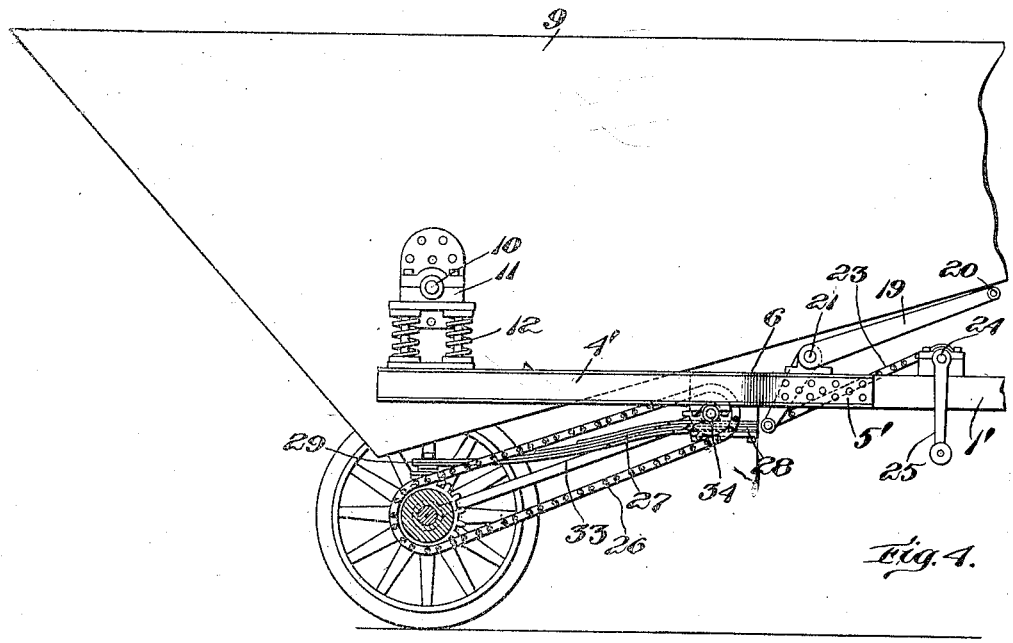
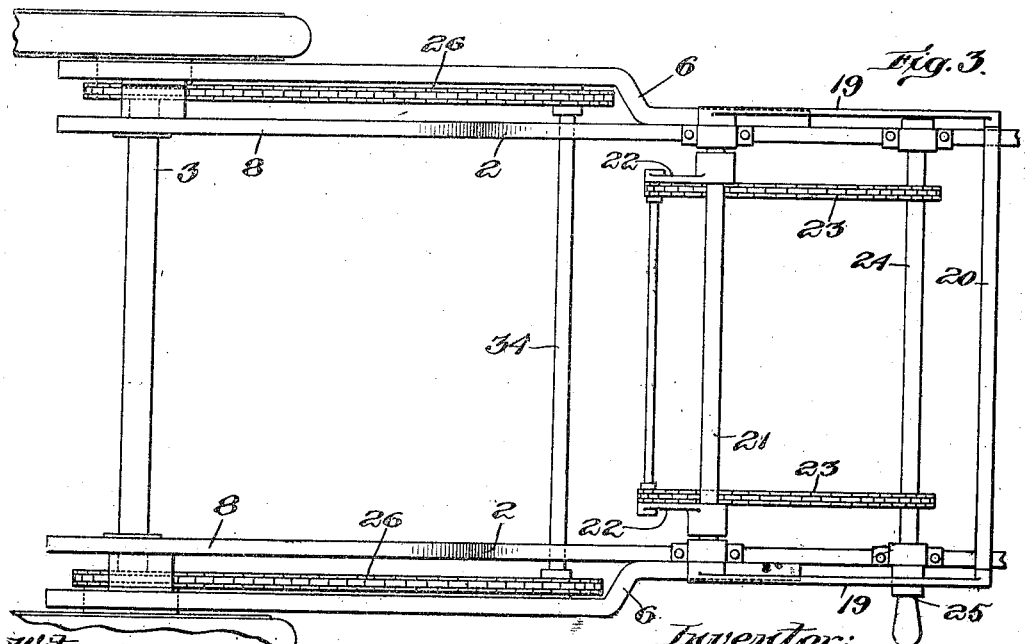

UNITED STATES PATENT OFFICE.

GEORGE W. LALLY, OF BOSTON, MASSACHUSETTS.

AUTO GARBAGE-TRUCK.

1,018,119.  Specification of Letters Patent.  Patented Feb. 20, 1912.

Application filed February 28, 1911. Serial No. 611,455.

*To all whom it may concern:*

Be it known that I, GEORGE W. LALLY, a citizen of the United States, residing at Boston, in the county of Suffolk and State of Massachusetts, have invented an Improvement in Auto Garbage-Trucks, of which the following description, in connection with the accompanying drawings, is a specification, like characters on the drawings designating like parts.

This invention relates to trucks especially adapted for the hauling and handling of garbage and like material in soft or semi-liquid form though it is also adapted for handling solid and granular material.

The invention consists in a novel construction of receptacle body for holding the material to be handled in connection with a modified form of automobile framework adapted for use in association therewith, whereby a body of relatively large carrying capacity may be mounted to have all necessary range of movement for convenient dumping of the material carried, while preserving the necessary rigid construction of automobile framework of a width suitable for use with the standard wheel spacing of vehicles.

Further features of invention relate to improved mechanism for tilting the body for dumping; to a novel construction of the receptacle body itself and to an improved form of spring mounting for the body on the automobile framework.

The above, and other detail features of the invention will be fully understood from the following description taken in connection with the accompanying drawings and thereafter pointed out in the appended claims.

Figure 1:
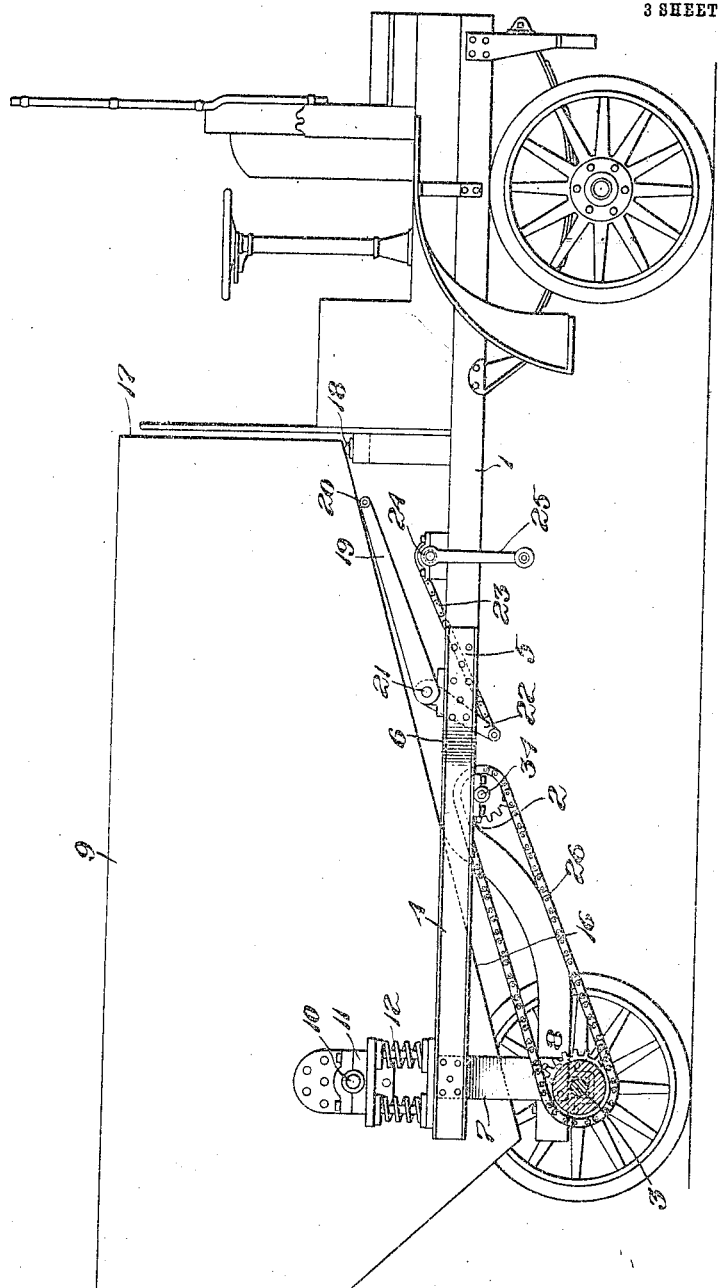
Figure 2:
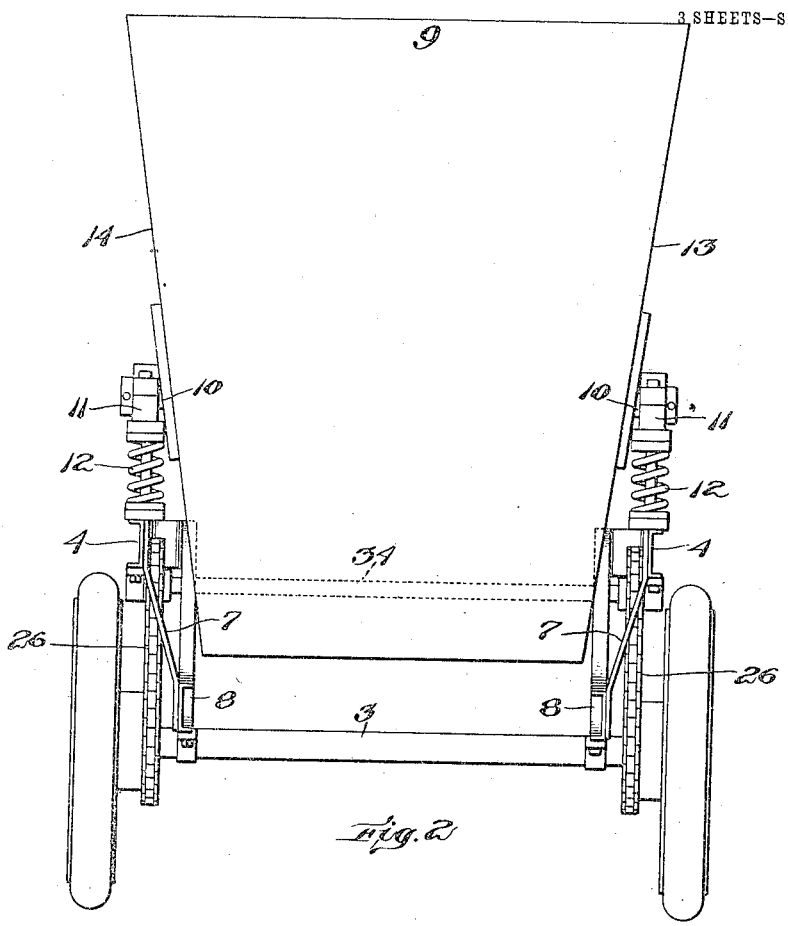

Referring to the drawings; Figure 1 is a side elevation of an automobile garbage truck constructed in accordance with my invention; Fig. 2 is a rear end view thereof; Fig. 3 is a partial plan view of the framework and operating mechanism thereof, the receptacle body being removed; Fig. 4 is a side elevation with the immaterial parts broken away of a modified form of the invention; and Fig. 5 is a partial rear elevation of said modified form with the receptacle body omitted.

Referring to Figs. 1 and 3, the forward part of the automobile framework or chassis may be of usual or any desired construction. The longitudinal side bars 1 of the framework are bent downward at 2, some distance from the rear axle so as to rest directly over the rear axle 3, while members preferably in the form of channel bars 4 are secured to the framework at 5 by bolts or otherwise, a little distance forward of the bends 2. The bars 4 are laterally off-set outwardly at 6 near their forward ends where they are secured to the framework at 5, and their rearward ends are supported by brace struts 7 secured thereto and to the downwardly bent ends 8 of the framework bars, these parts having suitable bearing support on the rear axle 3. The receptacle body 9 has pivots 10 journaled in bearing blocks 11 having a yieldable mounting 12 upon the outward ends of the bars 4. This body is formed with outwardly flaring sides 13, 14, a rear wall 15 sloping abruptly upward and a bottom wall 16 tapering gradually upward to a front vertical wall 17. The pivots 10 are somewhat to the rear of the center of gravity and a buffer support 18 is disposed underneath the front end of the body for the same to rest upon. The pivots 10 are mounted near enough to the center of gravity so that the body 9 can be tilted with comparative ease to dump the contents thereof, and to facilitate such tilting, arms 19 having their ends connected by bar 20 are mounted on a shaft 21 journaled in the framework and actuated by other arms 22 in fixed relation thereto. The outward ends of arms 22 are connected to a sprocket chain or other flexible connection 23 fastened to and operable by a windlass 24 on the framework, and having an operating handle 25. The power transmission to the vehicle may be by the usual sprocket drive 26, this typifying any suitable driving mechanism which forms no part of the present invention.

Figure 5:
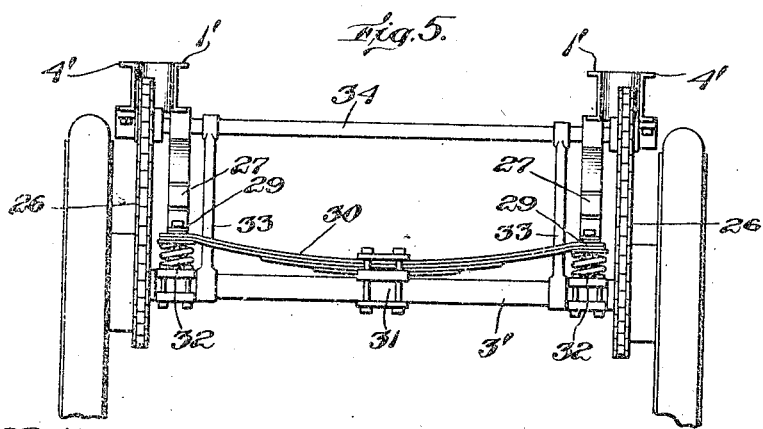

In Figs. 4 and 5 a modified form of the invention is shown wherein additional spring elements are interposed between the receptacle body and the wheel base support. In this form the body 9, its pivots 10, supporting blocks 11 and yieldable mountings 12 may be and preferably are identical with that of the form first described. The bars 4' may also be similar to the bars 4 with the same outward off-set 6 and similarly secured at 5' to the framework 1'. Instead, however, of the longitudinal bars 1' constituting the framework being bent downward to rest upon the rear axle as previously described, they terminate considerably short of the rear axle, i. e. adjacent the lateral off-sets 6 and the apparatus finds its rear support upon stout leaf springs 27 secured forwardly at 28 to the framework, and having their rear ends 29 resting upon a transverse leaf spring 30 fixed centrally at 31 to the rear axle 3'. Coil springs 32 may be interposed between the ends of the leaf spring 30 and suitable seats formed on the axle 3', to receive excessive pressures upon the leaf spring 30 and to coöperate with said spring to afford a support, resilient and at the same time substantial. Links 33 are journaled on the rear axle and on forward pivots of the framework, which may be the forward driving shaft 34 to assist in keeping the parts in proper relative positions and to relieve the spring connections of traction strains. The spring mounting thus produced is a desirable feature, in that it avoids or minimizes the clattering and rattling common to vehicles constructed of metal while reducing the danger of breakage or damage to any other parts through shocks or jars.

It is to be understood that while the complete coöperative arrangement of springs as shown in Figs. 4 and 5 is desirable and advantageous, my invention also contemplates the employment of certain of these spring elements without the others as may be found preferable in any particular case. For example, the longitudinal springs may be employed without the transverse leaf springs; or it may be found desirable in some instances to use the coil springs without the leaf springs.

The formation whereby the rear part of the chassis or framework is dropped to the rear axle either as the ends 8 forming a continuation of the longitudinal framework bars as in Figs. 1 to 3, or as the springs 27 in Figs. 4 and 5 with the outwardly off-set bars 4 forming virtually a widened continuation of the chassis framework to afford a support for the body, enables the use of a much larger receptacle body than would otherwise be possible while permitting its unobstructed tilting movement for dumping. It is to be observed that the particular form of body shown with the sloping end 15 and upwardly inclined bottom 16, enables the contents to be dumped after a relatively small tilting movement, this form also having a low center of gravity quite near the pivots 10 so that the dumping can be effected with comparatively little effort, especially with the aid of the arms 19 and windlass 24.

Having described my invention, what I claim as new, and desire to secure by Letters Patent is:

1. An apparatus of the kind described, comprising a vehicle framework having its rearward portion offset downwardly adjacent the rear axle, laterally offset portions fixed to the framework and extending rearwardly, and a receptacle body mounted on horizontal pivots and having support on said laterally offset rearwardly extending portions.

2. An apparatus of the kind described, comprising a vehicle framework having longitudinal parallel bars secured adjacent their ends to the rear axle, laterally offset bars secured to said framework bars and extending rearwardly above the same, and a body mounted on horizontal pivots, having supports adjacent the outer ends of said laterally offset bars.

3. An apparatus of the kind described, comprising a vehicle framework, having longitudinally extending parts offset downward adjacent their rear ends to a point adjacent the rear axle, laterally offset bars fixed to the framework and extending to the rear of the vehicle, and a body horizontally pivoted on said laterally offset bars.

4. An apparatus of the kind described, comprising an automobile framework, having its rearward portion offset downward, the rear axle supporting said downwardly offset portion, laterally offset members fixed to said framework and extending rearwardly, and a body having horizontal pivotal mounting on said laterally offset members.

5. An apparatus of the kind described, comprising an automobile framework having a downwardly offset support at its rearward portion to have bearing on the rear axle, laterally offset members fixed to the framework and extending rearwardly, a body having a bottom tapering forwardly upward, and horizontal pivot mountings for said body upon said laterally offset members, the lower portion of said body extending down between said laterally offset members.

6. An apparatus of the kind described, comprising an automobile framework having a downwardly offset rear portion, a rear axle supporting said downwardly offset portion, laterally offset members fixed to the framework and extending rearwardly of the vehicle, bearing blocks yieldably supported on said laterally offset members, and a body horizontally pivoted in said bearing blocks and having a portion extending down between said laterally offset members.

7. An apparatus of the kind described, comprising a vehicle framework having a downwardly offset rearward portion to engage the rear axle, laterally offset members fixed to the framework and extending rearwardly, a body, and horizontal pivot bearings supporting said body on said laterally offset members to permit the bottom of said body to extend between said members.

8. An apparatus of the kind described, comprising an automobile framework, having a downwardly offset yieldable member fixed to the rear portion thereof to rest upon the rear axle, laterally offset members fixed to said framework and extending rearwardly, and a body horizontally pivoted to said laterally offset members.

9. An apparatus of the kind described, comprising a vehicle framework having downwardly offset leaf springs fixed to a rear portion thereof and supported by the rear axle, laterally offset bars fixed to the framework and extending rearwardly, and a body horizontally pivoted to said bars.

10. An apparatus of the kind described, comprising an automobile framework, downwardly offset leaf springs fixed to a rear portion thereof, a transverse leaf spring supporting the ends of said springs and centrally fixed to the rear axle, laterally offset bars fixed to said framework, and a body having horizontal pivotal support on said laterally offset bars.

11. An apparatus of the kind described, comprising an automobile framework, downwardly offset leaf springs fixed to a rear portion thereof and extending over the rear axle, a transverse leaf spring fixed centrally to the rear axle and supporting the ends of said first named leaf springs, coil springs between the axle and the ends of said springs, laterally offset bars fixed to said framework and extending rearwardly, and a body having horizontal pivoted support on said bars.

In testimony whereof, I have signed my name to this specification, in the presence of two subscribing witnesses.

GEORGE W. LALLY.

Witnesses:
ANNA KELLY,
C. L. ROGERS.